United States Patent [19]

Byers

[11] Patent Number: 5,959,996

[45] Date of Patent: *Sep. 28, 1999

[54] SYSTEM FOR INTERFACING NUMEROUS ISDN DATA CONNECTING TO A DATA NETWORK THROUGH THE TELEPHONE NETWORK

[75] Inventor: Charles Calvin Byers, Aurora, Ill.

[73] Assignee: Lucent Technologies, Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,429

[22] Filed: Sep. 5, 1996

[51] Int. Cl.$^6$ ............................................. H04L 12/66
[52] U.S. Cl. ........................ 370/401; 370/463; 370/466; 370/474
[58] Field of Search ................................. 370/465, 466, 370/467, 474, 522, 524, 463, 252, 264, 359, 375, 376, 395, 401, 419, 420; 379/93, 94; 375/222; 770/468

[56] References Cited

U.S. PATENT DOCUMENTS

| | | | |
|---|---|---|---|
| 5,375,118 | 12/1994 | Rao et al. | 370/401 |
| 5,400,335 | 3/1995 | Yamada | 370/524 |
| 5,416,772 | 5/1995 | Helton et al. | 370/376 |
| 5,453,981 | 9/1995 | Katsube et al. | 370/397 |
| 5,521,919 | 5/1996 | Anderson et al. | 370/376 |
| 5,568,468 | 10/1996 | Ogasawara et al. | 370/230 |
| 5,600,469 | 2/1997 | Yamazaki | 370/466 |

*Primary Examiner*—Chi H. Pham
*Assistant Examiner*—Ricky Q. Ngo
*Attorney, Agent, or Firm*—Michael B. Johannesen

[57] ABSTRACT

A system for providing low cost data connections directly to a long distance switch in order to connect a plurality of ISDN-based data connections to a data network such as the Internet. A line card of this invention connects directly to a time slot interchange unit of a digital switch and receives ISDN data and control information, extracts the control information and sets up channels through to the data network, and provides ATM segmentation reassembly and header routing information in both directions. This system also provides policing and traffic shaping control for each ISDN connection and traffic control so that a particular ISDN connection does not overload the resources of the line card. The line card of this invention also provides ATM physical layer processing SONET encapsulation, and SONET optical interfaces to a router on the Internet. In this manner, numerous ISDN connections may be made inexpensively by using fewer ISDN modems and channel banks, and lessen the load on local switching systems.

11 Claims, 4 Drawing Sheets

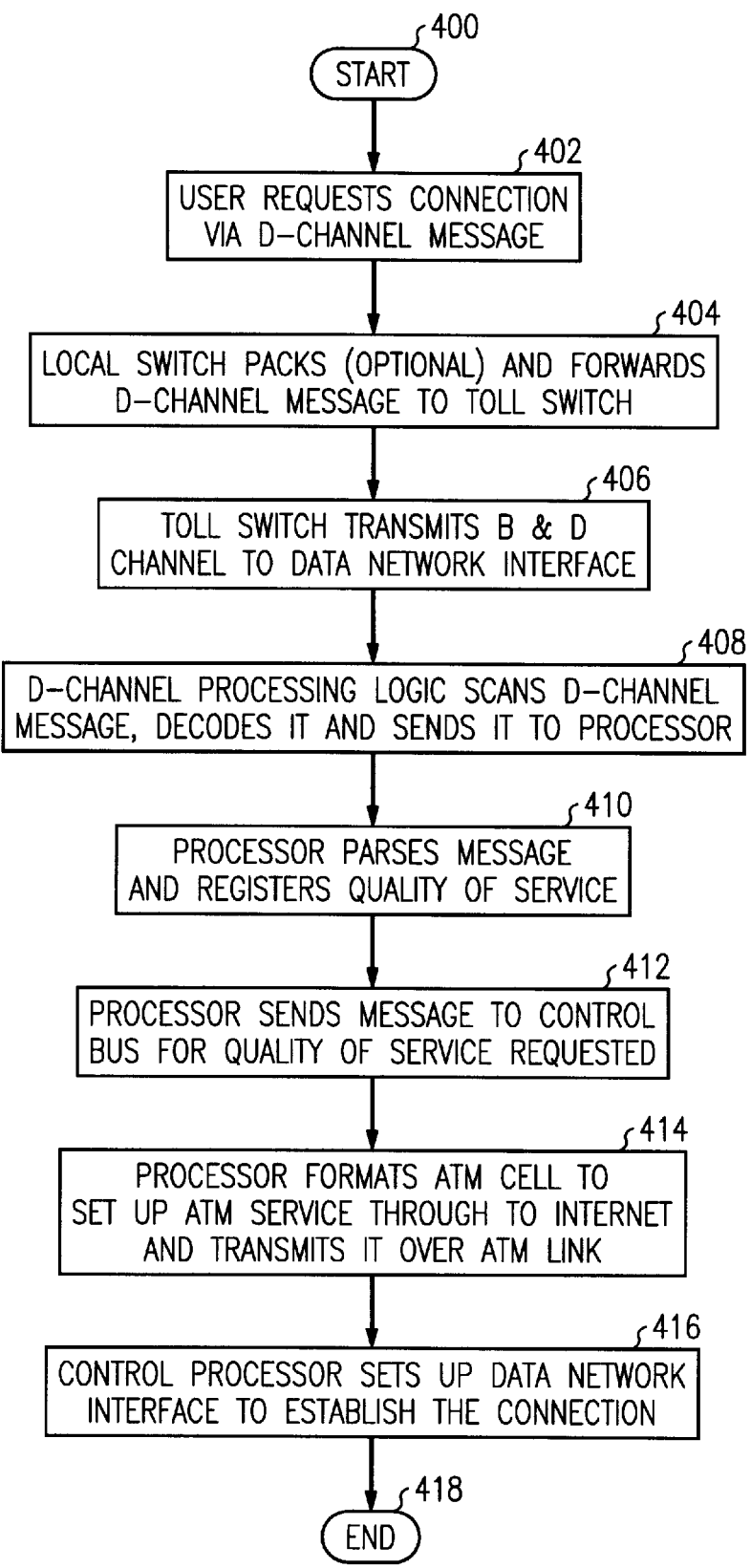

SYSTEM FOR INTERFACING NUMEROUS ISDN DATA CONNECTING TO A DATA NETWORK THROUGH THE TELEPHONE NETWORK

TECHNICAL FIELD

This invention relates to the field of interconnection of a telecommunications network and data communication network, and more specifically, to a single-card system for interfacing numerous telephone network ISDN data connections to a data network.

BACKGROUND OF THE INVENTION

The use of the telephone network for connection to data networks is currently growing at an exponential rate. More and more service providers are providing connections to, for example, the Internet at higher and higher bandwidths (data transfer speeds) for more and more users. Increasingly, more people are accessing such services at data speeds approaching or exceeding the bandwidth of normal telephone lines. The current state of the art computer data connector is a 28.8 Kbits per second (Kbps) modem, with 33.6 Kbps modems becoming available. However, for some applications, these modems still do not have enough bandwidth for large data transfers and, therefore, cannot handle the bandwidth required by some of the Internet, especially graphic or audio (or both) web pages. Furthermore, local switching systems are becoming overloaded because such large data transfers require that connections are held longer (in some cases, far longer) than normal voice calls, for which the systems were engineered.

A high bandwidth trunk (T1) connection to a home or small business is still relatively expensive (prohibitively so in most cases). As an alternative, many people are using an integrated services digital network (ISDN) telephone line for data communication, including connection to the Internet, at a higher speed than is obtainable through a voiceband modem. ISDN provides two "voice" and one "data" channel, otherwise known as 2B+D. The B channels operate at 64 Kbps, and the D channel operates at 16 Kbps. The B channels are intended for voice or data and the D channel is generally intended for signaling (i.e., setting up calls, etc.). By using an ISDN connection, a user may obtain data transfer speeds of up to 128 Kbps (using both B channels) for the cost of a single ISDN line. As more and more people are opting for ISDN (especially as more people begin to work at home), the cost of ISDN is dropping. Therefore, it is highly likely that in the near future there will be many ISDN connections, many of which will be accessing data networks (including the Internet) at some point or another.

Turning to FIG. 1, an illustration of the current art connection of an ISDN modem to a data network is shown. In this system, a personal computer or work station 12 of some variety known in the art is connected to an ISDN "modem" 14. There are many such ISDN modems available in the market place. ("ISDN modem" is a misnomer, since there is no modulation or demodulation. "Translator" would be a better term, but "modem" is used in the art, thus will be used herein). Alternatively, ISDN modem 14 may be an analog telephone/PC interface as described in U.S. Pat. No. 5,305,312, which issued Apr. 19, 1994 to M. Fomek, et al., and assigned to the assignee of the current invention (the specification of which is incorporated herein by reference). In this manner, a personal computer, work station or other computer-type system may be connected via ISDN to the public switched telephone network (PSTN) at data speeds of up to 128 Kbps.

ISDN line 16 is connected to local digital switching systems 20, as is known in the art. Such switching systems may be the same or similar to Lucent Technologies' 5ESS® ISDN switch as described in U.S. Pat. No. 4,592,048, which issued to M. W. Beckner, et al., on May 27 1986, and is also assigned to the assignee of this current invention (for a further discussion of the components of an ISDN switch, please refer to the previously referenced Fornek patent).

Local digital switch 20 delivers receives/transmits data between ISDN line 16 and transmission facilities, such as DS 3 lines 22 to/from a toll switch 24. Toll switch 24 may be the same or similar as AT&T's 4ESS™ switch, which is described in the Bell System Technical Journal (BSTJ), Vol. 56, No. 7, pgs. 1015–1320, September, 1977, which is incorporated herein by reference. Toll switch 24 includes central control 26 and interfaces 28 to transmission facilities 22, comprising a DS 3 to DS 0 interface, as is known in the art. Switching fabric 30 of toll switch 24 comprises a plurality of timeslot interchange units (TSI) represented by TSIs 32 and one or more time multiplex switches, represented by TMS 34. Time multiplex switches 34 are known in the art and described in the above BSTJ reference. Long distance switch 24 switches the data call through DS 3 interfaces 28, TSIs 32, and TMS 34 to another transmission facility 38 and to a data network server 40.

Data network server 40 comprises a multiplicity of units in order to connect a data stream from the telephone network to the Internet. Data network service center 40 may be in the same premises as long distance switch 24 or may be in a remote location. Data network service center 42 comprises a DS 3 demultiplexer 42, which demultiplexes DS 3 into 28 DS 1s comprising 672 DS 0 channels. Each channel is delivered to and received from a channel banks 44, as is known in the art, which translates between pulse code modulated (PCM) as is used in the telephone art and ISDN data. ISDN data lines are connected between channel bank 44 and a plurality of ISDN modems (represented by ISDN modems 48) in ISDN modem bank 50. ISDN modems 48 translate to the data protocol from ISDN into a local area network protocol such as Ethernet and transmit a data on local area network 52 to a broadband router (B-router) 54. B-router 54 connects the ISDN channels to the Internet or other data network 56.

In the system of FIG. 1, there are many network facilities being used. For example, a complete connection through long distance switch 24 is made for every ISDN connection. DS3 facilities are used to connect between long distance switch 24 to data network service 40, requiring electrical and/or optical transmission facilities. Most importantly, there is a one-to-one ratio between ISDN modems at the telephone network/data network interface, which, in a heavily used system, is exceedingly expensive.

Therefore, a problem in the art is that there is no economical system for connecting ISDN-based data links to data networks, such as the Internet.

SUMMARY OF THE INVENTION

This problem is solved and a technical advance is achieved in the art by a system and method that provides low cost data connections directly between a long distance switch and a data network to connect a plurality of ISDN-based data connections to a data network, such as the Internet. This system comprises a new line card, which interfaces directly to a time slot interchange unit of a digital switch. This line card receives ISDN data and control information, extracts the control information, sets up channels through to the data network, and provides asynchronous transfer mode (ATM) segmentation/reassembly and header routing information in both directions. This system also provides policing and traffic shaping control for each ISDN connection so that a particular ISDN connection does not overload the resources of the line card.

The line card of this invention also provides ATM physical layer processing, SONET encapsulation, and SONET optical interfaces to a router on the Internet. In this manner, numerous ISDN connections may be made inexpensively by using fewer ISDN modems and channel banks.

BRIEF DESCRIPTION OF THE DRAWING

A more complete understanding of the invention may be obtained from the consideration of the following description in conjunction with the drawings in which:

FIG. 4 is a flow chart showing a setup scenario as practiced in the bulk ISDN line card of FIG. 3.

DETAILED DESCRIPTION

Figure 1:
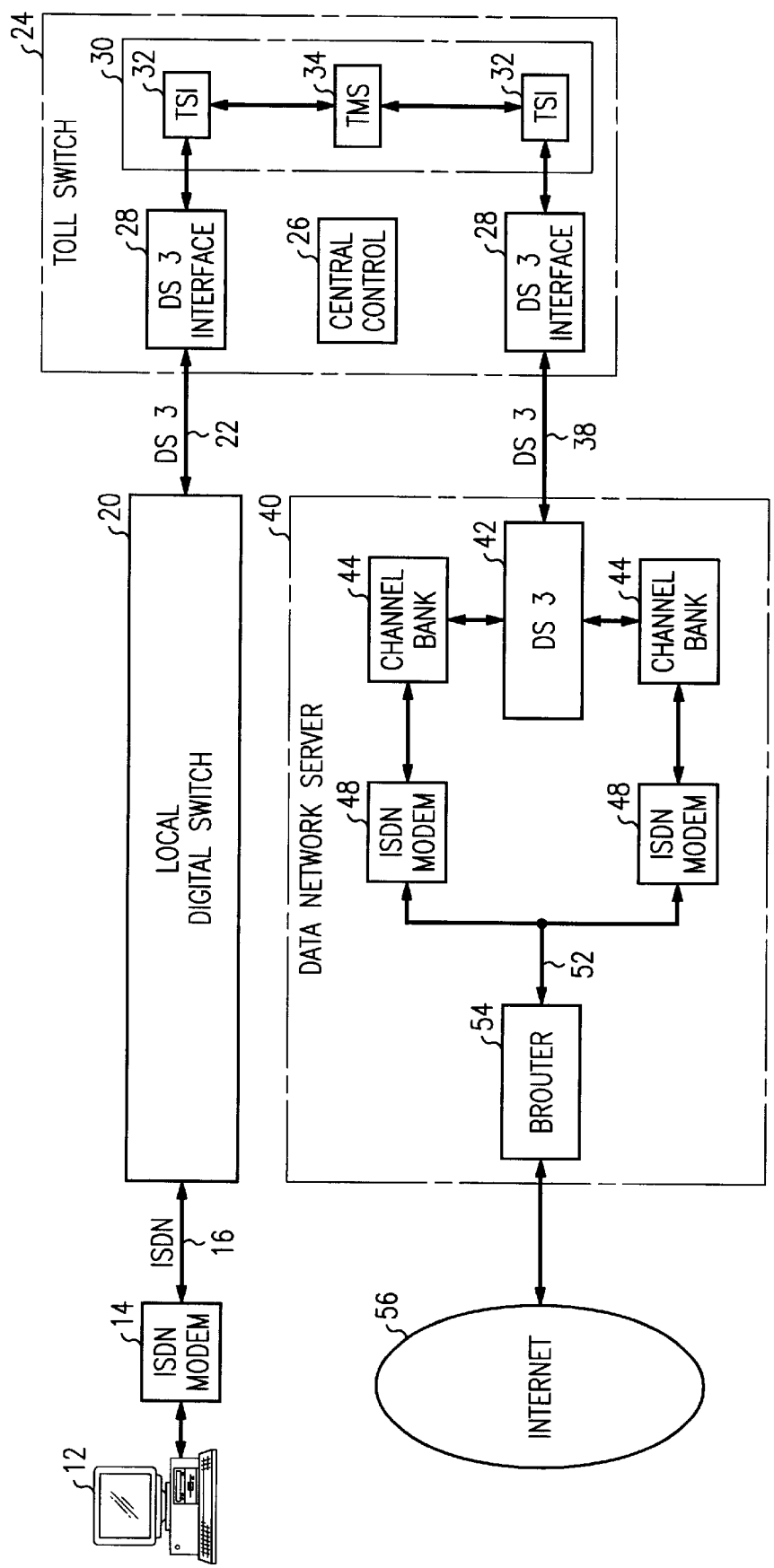
FIG. 1 is a block diagram of a prior art telephone network showing ISDN connections through the telephone network to a data network such as the Internet.
Figure 2:
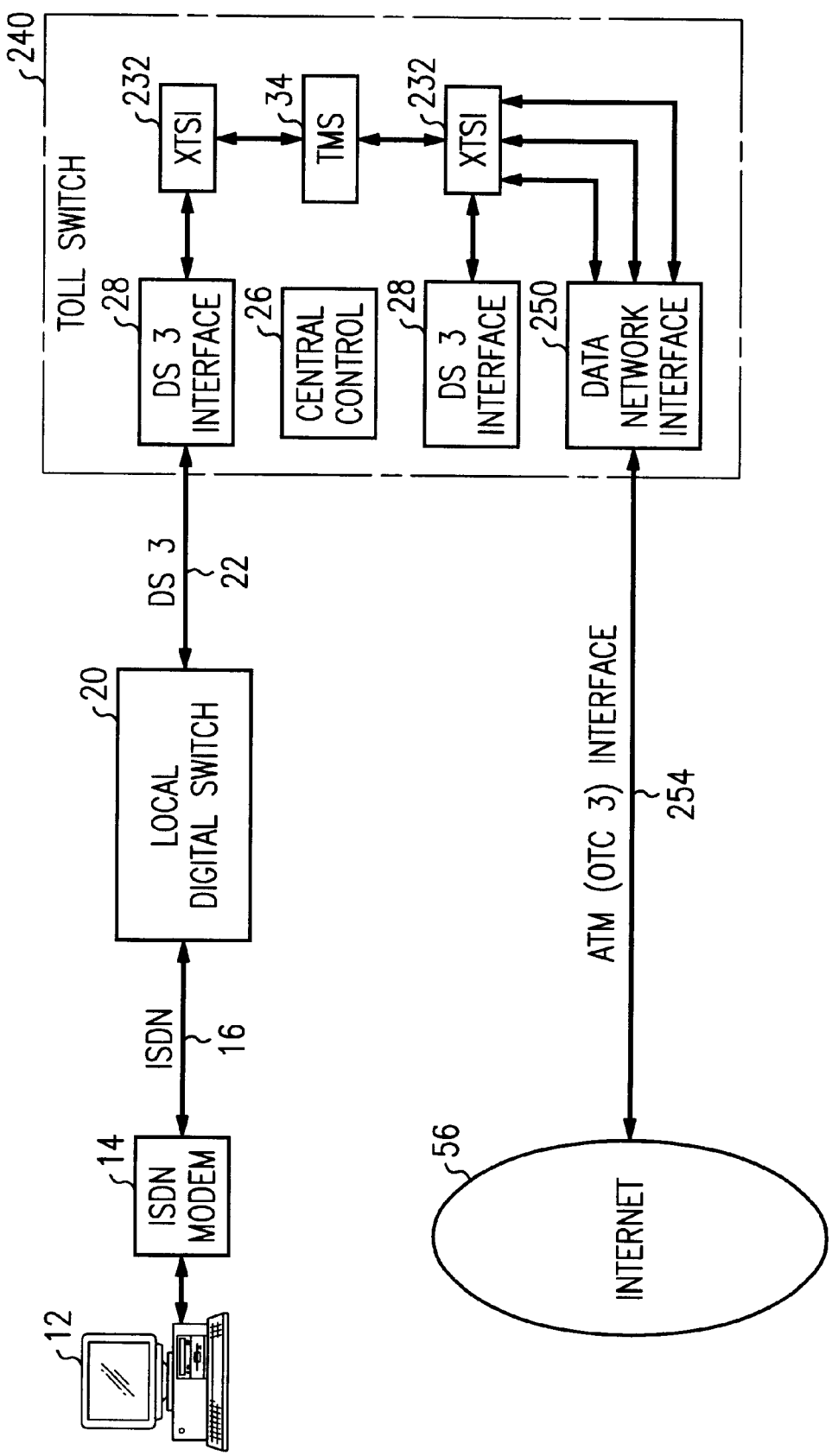
FIG. 2 is a block diagram showing a telephone network using the exemplary embodiment of this invention to connect ISDN data connections to a data network.

FIG. 2 illustrates a block diagram of an ISDN connection to a data network (the Internet in this exemplary embodiment) via a telephone switching network. As in the prior art, a personal computer or other computer device 12 is connected via an ISDN modem 14 to an ISDN line 16. ISDN line 16 connects ISDN modem 14 to a local switching system 20. Local switching system 20 connects to a transmission facility and through a DS3 22, all as in the prior art.

DS3 22 connects local switch 20 to toll switch 240 at an extended timeslot interface (XTSI), such as XTSI 232. An extended timeslot interface unit is generally larger than the standard timeslot interchange unit by a factor of at least two. XTSIs are described in Anderson, et al, U.S. Pat. No. 5,521,919, which issued May 28, 1996, is assigned to the assignee of this invention, and is incorporated herein by reference. In general, data calls may be routed through XTSI 232, as is known in the art and described in the above patent through time multiplex switch (TMS) 234. TMS 234 routes the data connection through another XTSI 232.

As stated above, in the prior art, the data connection would then be sent through DS3 interface 28, and DS3 transmission facility 38, into a data network server. However, according to this exemplary embodiment of this invention, XTSI 232 is connected directly to a data network interface card 250. XTSI 232 provides a "back door" interface to the data network interface 250, which then prepares the data for connection to an ATM (OC3) SONET link 254 to the Internet, or other data network 56. In this manner, expensive transmission facilities are saved, in that one ATM OC3 link replaces one or more DS3s and the entire data network server center comprising a plurality of channel banks, ISDN modems, a local area network, a DS3 multiplexer and B-router are eliminated. Furthermore, local switching load is greatly reduced, because data connections will not take as long as in the prior art.

Figure 3:
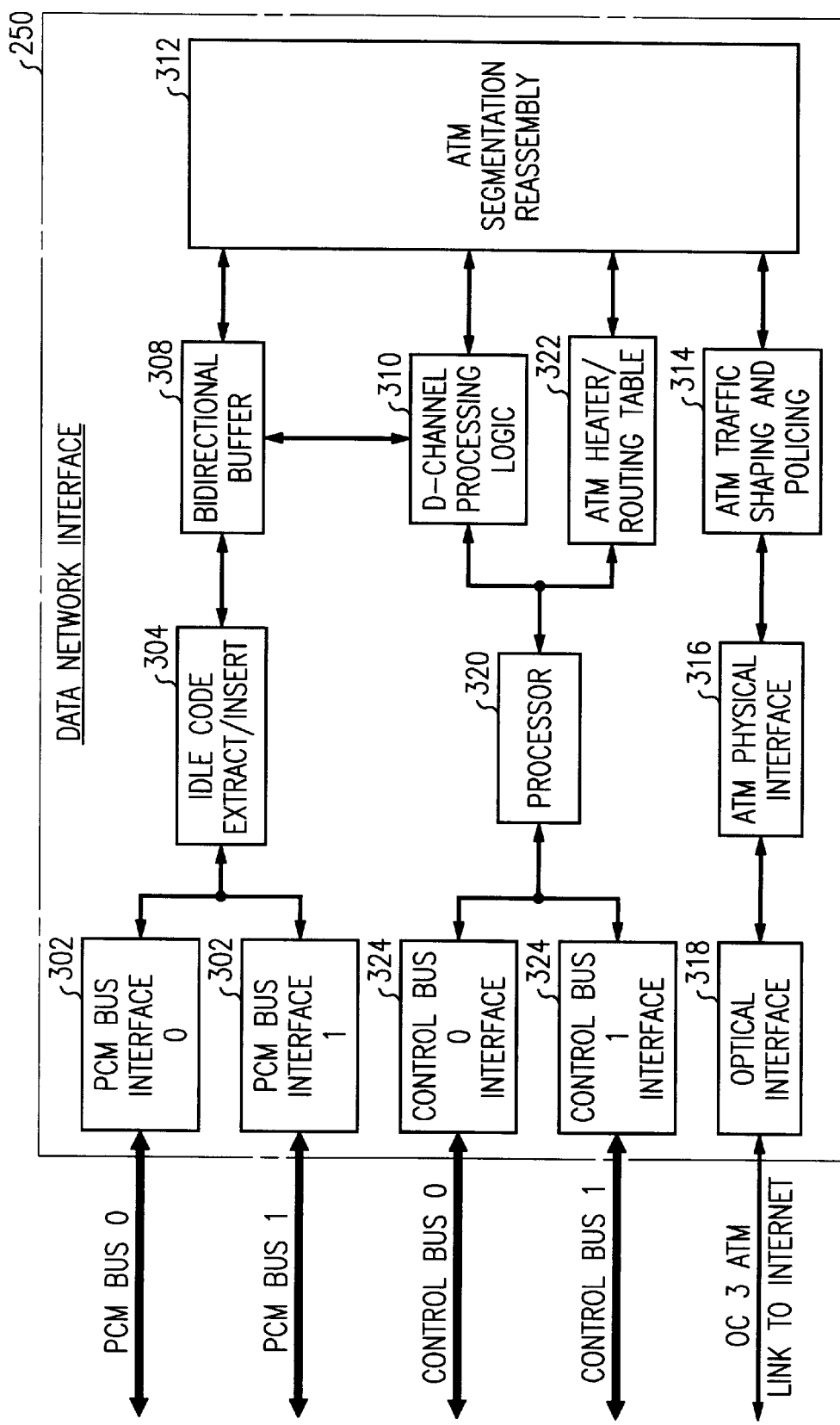
FIG. 3 is a block diagram of a bulk ISDN interface line card, as shown in FIG. 2.

Such advantages are realized through the novel data network interface linecard 250, depicted in FIG. 3. In this figure, there are illustrated two pulse code modulated (PCM) bus interfaces 302. These are shown as duplex because of the duplex nature of the XTSI, as known in the art. Only one channel would necessarily be active at a given time. Such PCM bus interfaces 302 may carry 2048 B channels at any given time. PCM bus interfaces 302 are connected to an idle code extract/insert function box 304, which scans the content of the packet stream for idle code and removes such data for the PCM (telecommunications) connection.

The idle code extract/insert is connected via bidirectional data bus to a bidirectional buffer 308. Bidirectional buffer 308 provides several functions. First, for data coming in from the telephone network, it receives the data and holds it for ATM segmentation. Second, bidirectional buffer holds data coming in from the ATM network to provide a smoothing function so that when it is sent back out onto the telephone network, the data can be transmitted in a smooth, synchronous fashion. Finally, bidirectional buffer 308 scans for data channel packets and sends them to D channel processing logic 310, which will be described below. Bidirectional buffer 308 is connected to ATM segmentation/reassembly buffer 312, such as is known in the art.

ATM segmentation reassembly buffer 312 is connected to ATM shaping and policing system 314. ATM traffic shaping and policing insures that the bandwidth of the optical link is being fully utilized and, conversely, determines if a particular ISDN connection is using more than its allocated share of bandwidth. If so, ATM traffic shaping and policing system 314 sends a "throttle back" message, back to the source ISDN system and, in severe cases, performs ATM cell dropping.

ATM shaping and policing system 314 is connected to an ATM physical interface 316 which provides bidirectional ATM interface to the data network interface line card 250. Such interfaces as 316 are available from many microelectronic vendors. Finally, line card 250 includes an optical interface 318 which provides OC3 ATM link to the Internet.

Processor 320 comprises a RISC processor such as a Motorola power PC, but may be any processor as known in the art. Processor 320 communicates with control processor 26 via a pair of control bus interfaces 324. Control bus interfaces 324 send and receive bus protocol between processor 320 and the control processor such as a 1B processor as is known in the art.

Turning now to FIG. 4, the functionality of D-channel processing logic 310 is shown in an exemplary session setup scenario. Processing starts in circle 400 and moves to action box 402 where an ISDN user requests a connection via a D channel message from a PC 12 through an ISDN modem 14 (FIG. 2). In box 404, local switch 20 optionally packs the D channel message with other D channel control messages it is receiving and forwards the D channel to toll switch 24. In box 406, toll switch 24 recognizes the B channel streams and sends them to the data network line card 250. The D channel processing logic 310 scans the D channel message, decodes it, and sends it to processor 320 in box 408.

In box 410, processor 320 processes the message for setup and bandwidth request (a request of quality of service). Processor 320 also sets up header routing information for this particular session in ATM header routing table 322. Processor 320 then, in box 412, sends the message to control bus and the controlling processor of the long distance switch to set up the requested bandwidth through the XTSI and TMS (if necessary). In box 414, processor 320 then formats an ATM cell to establish ATM connection through the Internet and transmits it over the ATM link. In box 416, the controller for the XTSI sets up the bulk ISDN interface line card tables to establish this connection. At this point, the connection is established and processing ends at circle 418 as a stable connection has been established.

It is to be understood that the above-described embodiment is merely an illustrative principle of the invention, and that many variations may be devised by those skilled in the art without departing from the scope of this invention. It is, therefore, intended that such variations included be within the scope of the claims.

The invention claimed is:

1. A system providing a connection interface between a digital circuit and a data network, comprising:
   a first and second extended time slot interchange units capable of transmitting and receiving data signals;
   at least one extended time multiplexed switch capable of routing the data signals between the first and second extended time slot interchange units;
   a data network interface connected between the second extended time slot interchange unit and the data network, having at least two PCM bus interfaces providing the duplex capabilities of the extended time slot unit and capable of receiving ATM packets;
   the data network interface capable of translating ISDN signals into ATM packets and ATM packets into the ISDN signals, extracting control information from the ISDN signals and the ATM packets and responding to the control information; and
   where the data network interface contains an idle code extract/insert circuit capable of scanning packet data streams for idle code and removing the idle code.

2. A telecommunications switch interface that provides a data connection between a telecommunications network that transmits data in a first format and a data network that transmits data in a second format, said telecommunications switch having a time slot interchange connected to the telecommunications network, said interface comprising:
   a time slot interchange interface connected to said time slot interchange;
   a buffer for converting data between said first format and said second format connected to the time slot interchange interface;
   a processor connected to the buffer and the telecommunications switch for receiving control messages from the telecommunications network and controlling the system according to the control messages; and
   a data network interface connected to the buffer and the data network for conveying data between the data network and the buffer.

3. The system according to claim 2, wherein the second format comprises ATM, and wherein the data network interface includes an ATM segmentation/reassembly circuit.

4. The system according to claim 2 wherein the second format comprises ATM packets, wherein the buffer is capable of storing data from an ATM packet for smoothing purposes and for synchronous transmission to the telecommunications switch.

5. The system according to claim 2 wherein the second format comprises ATM, and wherein the data network interface includes an ATM traffic shaping and policing system.

6. The system according to claim 5, where the ATM traffic shaping an policing system is capable of insuring that a bandwidth of the data network is fully utilized and is capable of sending a "throttle back" message to a device connected to the telecommunications network.

7. The system according to claim 5, where the ATM traffic shaping and policing system is capable of dropping the ATM packets to insure full utilization of the data network's bandwidth.

8. A method for setting up a data connection between an integrated services digital network (ISDN) device and a data network through a telephone network, the telephone network including a digital switching system having an extended time slot interchange unit, the method comprising the steps of:
   the ISDN device requesting a connection via a D channel message;
   the digital switching system recognizing the D channel message and sending the message through the extended time slot interchange unit to the bulk ISDN line card;
   a bulk ISDN line card setting up a data connection to the data network responsive to the D channel message;
   the bulk ISDN line card receiving data from the telephone network, translating the data from the telephone network to the data network, and sending the data to the data network,
   the bulk ISDN line card receiving data from the data network, translating the data from the data network format to the data network format, and sending the data through the digital switch to the ISDN device; and
   the D channel message includes a request for bandwidth, determining whether the requested bandwidth is available, if the bandwidth is available, setting up a connection for the requested bandwidth, and if the requested bandwidth is not available, negotiating with the ISDN device for an available bandwidth.

9. The method according to claim 8, further comprising the step of after the connection is set up, policing the connection to ensure that the ISDN device does not exceed its allocated bandwidth.

10. The method according to claim 9, further comprising the step of if the ISDN device exceeds its bandwidth, sending throttle-back message to the ISDN device.

11. The method according claim 9, further comprising the step of if the ISDN device is not responsive to the throttle-back message, dropping portions of the data stream.

* * * * *